C. A. FULLER.
WASHING APPARATUS FOR MOTOR VEHICLES.
APPLICATION FILED OCT. 16, 1915.
1,203,525.
Patented Oct. 31, 1916.
2 SHEETS—SHEET 1.
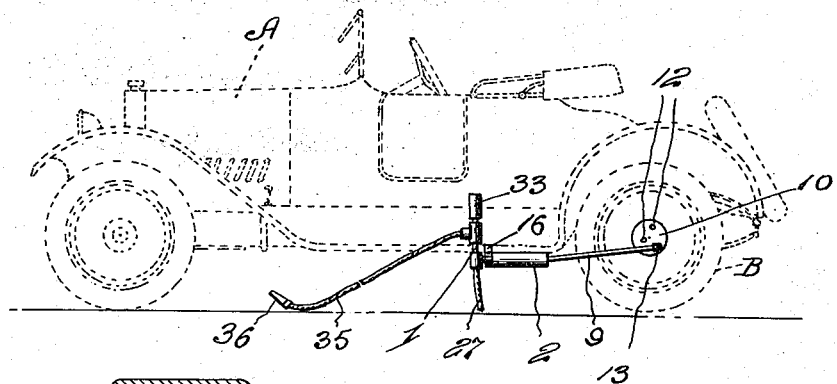
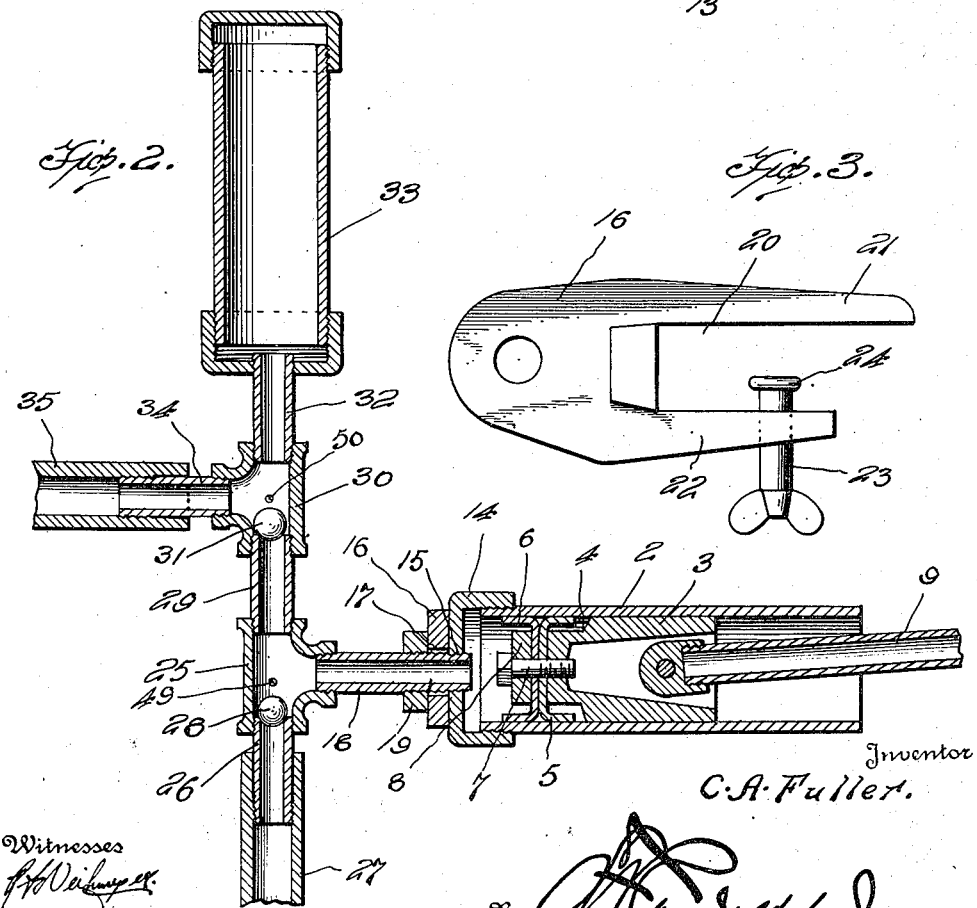

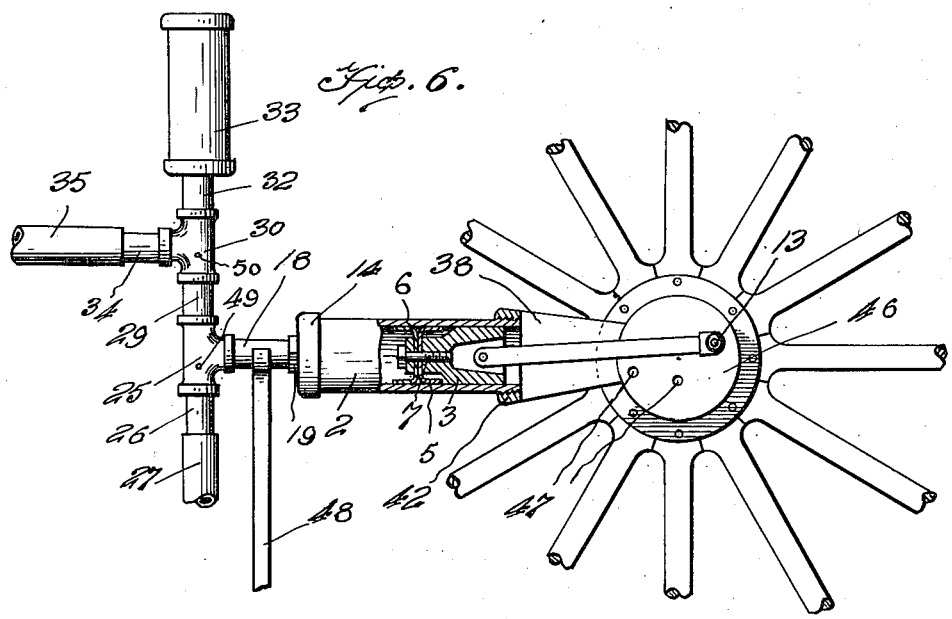

UNITED STATES PATENT OFFICE.

CLARK A. FULLER, OF MENOMONIE, WISCONSIN.

WASHING APPARATUS FOR MOTOR-VEHICLES.

1,203,525.  Specification of Letters Patent. Patented Oct. 31, 1916.

Application filed October 16, 1915. Serial No. 56,321.

*To all whom it may concern:*

Be it known that I, CLARK A. FULLER, a citizen of the United States, residing at Menomonie, in the county of Dunn and State of Wisconsin, have invented certain new and useful Improvements in Washing Apparatus for Motor-Vehicles; and I do hereby declare the following to be a full, clear, and exact description of the invention, such as will enable others skilled in the art to which it appertains to make and use the same.

This invention relates to a motor vehicle washing device.

The object of the present invention is to provide a simple, practical and inexpensive device of strong and durable character, which can be associated with an automobile or other motor vehicle and conveniently and expeditiously connected with one of the driving wheels of the vehicle, so that the motor of the vehicle can be utilized for operating the washing device, and which when in operation will discharge water under sufficient pressure, to remove the dirt, mud or other foreign matter which adheres to the vehicle.

Other objects will appear and be better understood from that embodiment of my invention of which the following is a specification, reference being had to the accompanying drawings forming a part thereof, in which:

Figure 1 is a side view of an automobile, showing the washing device applied thereto. Fig. 2 is a vertical detail section taken through the washing device. Fig. 3 is a side view of one form of supporting clamp for the washing device. Fig. 4 is a top plan view of one form of attachment for the washing device, to the driving wheel of the vehicle. Fig. 5 is a side view of the device shown in Fig. 4. Fig. 6 is a detail elevation of the washing device, showing another form of attaching device to attach the pump to the driving wheel of the vehicle. Fig. 7 is a top plan view of the pump shown in Fig. 6, showing the same removed from the vehicle wheel.

Referring to the drawings, the letter A designates a motor vehicle, which for conventional purposes is shown as an automobile, and B, one of the rear driving wheels.

The washing device is shown as an entirety by the numeral 1, and 2, designates a horizontally disposed cylinder, having mounted therein for reciprocating movement, a piston 3, one end of the piston being reduced as shown at 4, and the said reduced end being received by a cup shaped leather body 5, which has its side walls snugly and slidably engaging the inner surface of the wall of the cylinder 2 as shown in Fig. 2, and a second cup shaped leather body, being designated by the numeral 6, is located within the cylinder 2 and has its side walls snugly and slidably fitting the inner surface of the wall of the cylinder and extending in opposite direction to the walls of the cup shaped body 5, the bases of the cup shaped bodies 5 and 6 being positioned in engagement with each other, and secured to each other by means of a bolt 7 which extends through the bore of a nut 8, positioned within the cup shaped body 6 and through the bases of the cup shaped bodies 5 and 6 and through the adjacent end of the piston 3. The opposite end of the piston head 3 has connection with one end of a piston rod 9, the opposite end of the piston rod 9 having connection with a hub screw cap 10, of the driving wheel. The screw cap 10 is provided with a plurality of openings 12, the said openings being located at unequal distances from the center of the cap 10 and are adapted to interchangeably receive the transversely extending pin 13 carried by the adjacent end of the piston rod 9, so as to adjust the stroke of the piston within the cylinder 2.

The outer end of the cylinder 2 carries a removable cap 14, which cap is concentrically provided with an opening 15 communicating with the interior of the cylinder 2, the walls of the opening being threaded. An elongated clamping member 16 extends at an angle to the cap 14, and has one end engaging the outer side of the end wall of the cap and is provided with an opening 17 registering with the opening 15 in the cap 14, the walls of the opening 15 being threaded. A pipe section 18 has one end threadably received by the openings in the end of the clamping member 16 and the cap 14 and the said end of the pipe section has a nut 19 adjustable thereon and against the adjacent end of the clamping member 16 so as to secure the adjacent end of the clamping member 16 in position. The opposite end of the clamping member 16 is bifurcated as is shown at 20 so as to provide the fingers 21 and 22, the said fingers being adapted to straddle the running board of the vehicle, as is shown in Fig. 1 and support the outer end of the cylinder 2. A bolt 23 is adjustable through the finger 22 and has its inner end provided with a flange 24 adapted to engage the under side of the running board.

The outer end of the pipe section is threadably received by a stem of a T-coupling 25. One end of the head of the T-coupling 25 engages one end of the pipe section 26, the other end of the pipe section 26 being received by one end of a flexible tube 27 which communicates with a water supply not shown. The pipe section 26 has the end which is received by the head of the T-coupling 25 formed to provide a seat for a ball valve 28. The opposite end of the T-coupling 25 receives one end of a vertically disposed pipe section 29, the upper end of which is received by one end of the head of a T-coupling 30, the said end of the pipe section 29 being formed to provide a seat for the reception of a ball valve 31. The other end of the T-coupling 30 threadably receives the lower end of a vertically disposed pipe section 32, the upper end of which communicates with an air chamber 33. A horizontally disposed pipe 34 has one end received by the stem of the T-coupling 30 and has its opposite end received by a flexible tube 35, the outer end of the tube being provided with a nozzle 36, of any suitable construction.

The device so far described, operates as follows: The driving axle of the vehicle is jacked up, as shown in Fig. 1 of the drawings, and the screw hub cap 10 is screwed onto the hub of the driving wheel, and the pin in the end of the piston rod 9 fitted in one of the openings 12 to the screw cap 10, and the clamping member 16 connected to the running board of the vehicle. The tube 27 is then placed in communication with the source of water supply, not shown, and the motor started to operate the piston 3. The suction caused by the rear stroke of the piston 3 unseats the ball valve 28 and draws the water upwardly through the tube 27 and past the ball valve 28 and the forward stroke of the piston will close the valve 28 and cause the water to be forced upwardly to the pipe section 29 and unseat the valve 31. A part of the water will escape through the pipe 34 and through the tube 35 another portion of the water will pass upwardly through the pipe section 32 and into the chamber 33. During the rapid operation of the piston the chamber 33 will be partially filled with water, and the air within the same compressed so that a uniform flow of water through the tube 25 will be obtained.

The modified form of couplings shown in Figs. 4 and 5, are used when the vehicle is not provided with hub caps. The couplings shown in these figures include a bowed bar 37 having a concavo-convexed cap 38 mounted centrally thereon and adapted to receive the hub of the vehicle wheel and the opposite ends of the bar are provided with openings which receive the shanks of hooks 39—39, the said hooks being adapted to engage certain of the spokes of the drive wheels and the said shanks have nuts 40 mounted thereon and adjustable against the bar 37 so as to secure the hooks in place. The bar 37 is provided, at a point adjacent the cap 38, with a bolt 41 which is adjustable through the bar and to which is adapted to be connected the outer end of the piston rod 9.

In the constructions shown in Figs. 6 and 7, the rear end of the cylinder 2 is threadably received by a collar 42, which is carried by one end of an offset bracket 43, and the other end of the bracket 43 has secured thereto a sleeve 44 which loosely receives a stud 45, one end of the stud portion 45 being adapted to be received by an opening in the hub cap 10 and the other end of the stud carries a disk 46 provided with a plurality of openings 47 spaced unequal distances from the center of the disk 46. The pin 13 on the outer end of the piston rod 9 is adapted to be interchangeably received by the openings 47 so as to adjust the stroke of the piston 3. In this last described construction, the clamping member 16 is eliminated and the forward end of the cylinder 2 is supported by vertical supports 48, the lower end of which rests upon the ground or other surface, and the upper end of which is bifurcated and engages under the pipe section 18. The walls of the T couplings 25 and 30 have pins 49 and 50 extending therethrough and at points spaced above the ball valves 28 and 31, and provide stops for limiting the upward movements of the said ball valves.

Having thus described my invention, what I claim as new is:—

1. A washing device for motor vehicles, the combination with a pump cylinder, of a supply pipe and a discharge pipe, a cap carried by the cylinder and having an opening therein communicating with the interior of the cylinder, a pipe having one end communicating with the discharge and supply pipe and its opposite end communicating with the interior of the cylinder, and a supporting member having one end associated with the last mentioned pipe and its opposite end connected to the vehicle.

2. A washing device of the class described including a pump cylinder having a reciprocating piston therein, coupling means for connecting the piston to one of the drive wheels of a motor vehicle, said coupling means comprising a resilient bar having openings in the ends thereof, hooks having their shanks adjustable within the openings in the bars, the said hooks being adapted to engage certain of the spokes of the wheel, a cap carried by the bar for engaging the hub of the wheel, and a bolt carried by the bar and located adjacent the cap.

In testimony whereof I affix my signature in presence of two witnesses.

CLARK A. FULLER.

Witnesses:
N. O. VARNUM,
M. A. ZARSKE.